United States Patent [19]

Tsutsui et al.

[11] Patent Number: 5,057,925
[45] Date of Patent: Oct. 15, 1991

[54] STILL PICTURE RECORDER UTILIZING A SWITCH CONTROLLED TIMER

[75] Inventors: Satoru Tsutsui; Katsuhiko Nuno; Takao Inoue; Takashi Ohkuma, all of Yokohama, Japan

[73] Assignee: Ricoh Company, Ltd., Tokyo, Japan

[21] Appl. No.: 549,917

[22] Filed: Jul. 9, 1990

[30] Foreign Application Priority Data

Jul. 11, 1989 [JP] Japan .................................. 1-178838

[51] Int. Cl.$^5$ .............................................. H04N 5/30
[52] U.S. Cl. ..................................... 358/209; 358/906; 358/909; 358/335; 358/310
[58] Field of Search ............. 358/909, 906, 209, 22 C, 358/21 V, 342, 335, 310; 360/35.1

[56] References Cited

U.S. PATENT DOCUMENTS

| | | | |
|---|---|---|---|
| 4,714,963 | 12/1987 | Vogel | 358/909 |
| 4,714,966 | 12/1987 | Saito | 358/906 |
| 4,783,707 | 11/1988 | Nemoto | 358/342 |
| 4,792,863 | 12/1988 | Urabe | 358/909 |
| 4,797,751 | 1/1989 | Yamaguchi | 358/906 |
| 4,901,160 | 2/1990 | Kinoshita | 358/906 |
| 4,903,132 | 2/1990 | Yamawaki | 358/209 |
| 4,943,867 | 7/1990 | Suetaka | 358/906 |

FOREIGN PATENT DOCUMENTS 0104583 6/1983 Japan .

Primary Examiner—Tommy P. Chin
Assistant Examiner—Sherrie Hsia
Attorney, Agent, or Firm—Oblon, Spivak, McClelland, Maier & Neustadt

[57] ABSTRACT

A still picture recorder has a video signal producing circuit for converting a picked-up image into a video signal and a memory section for storing information as a still picture from video information transmitted from the video signal producing circuit by a supplied control signal, the memory section transmitting the still picture information stored in accordance with the control signal. A recorder then records the video information to a recording medium in accordance with the control signal. A switch for indicating that the still picture is recorded to the recorder and a control section for transmitting the control signal to the memory section and the recorder by operating the switch are also utilized.

4 Claims, 13 Drawing Sheets

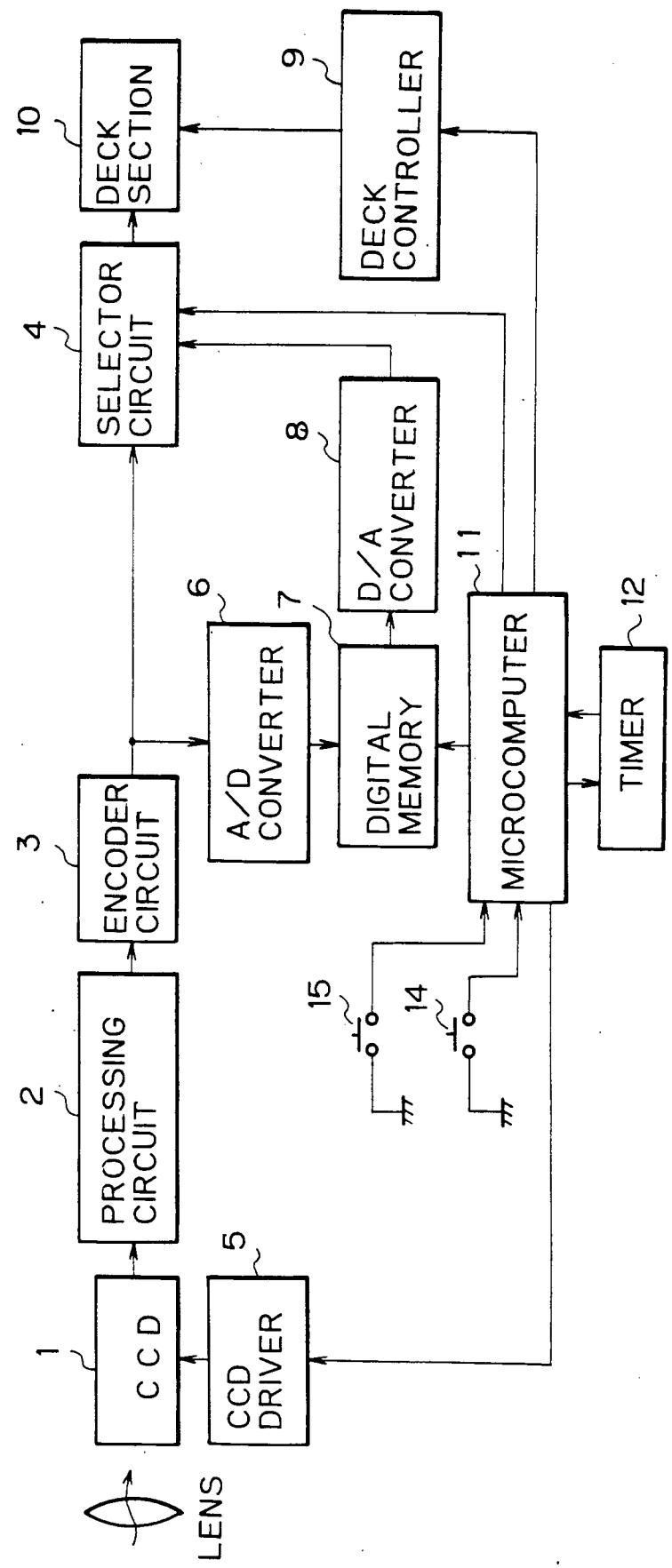

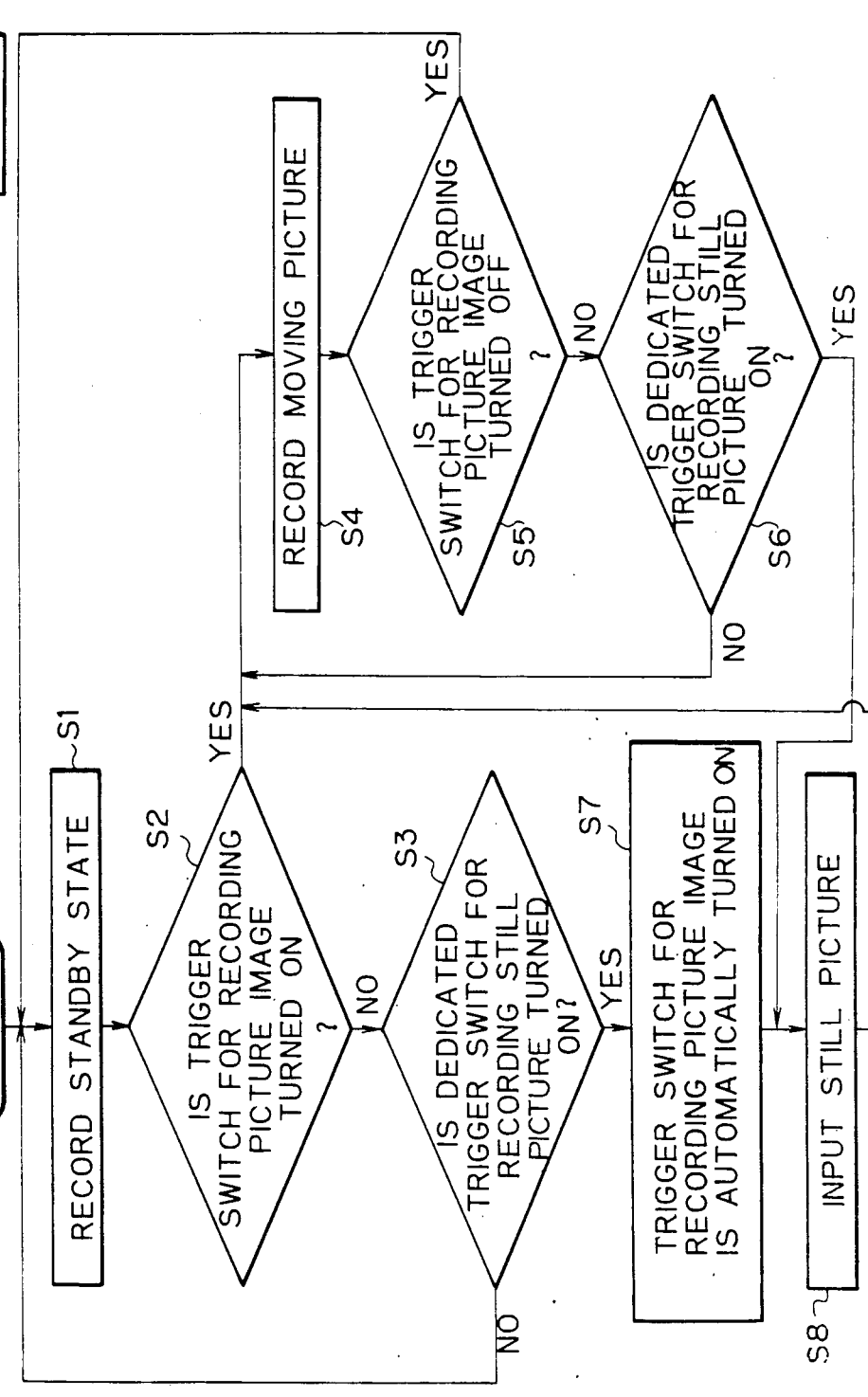

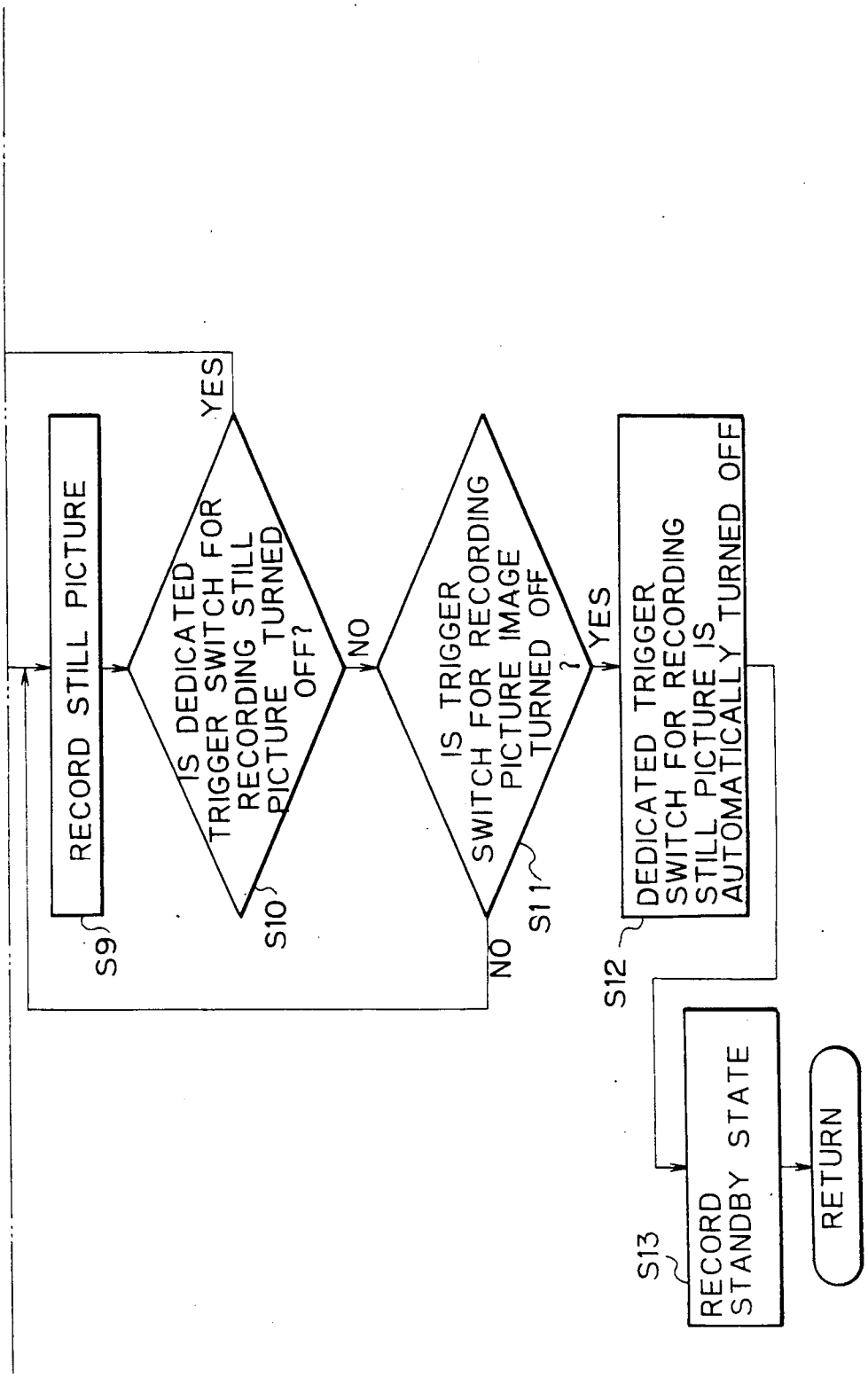

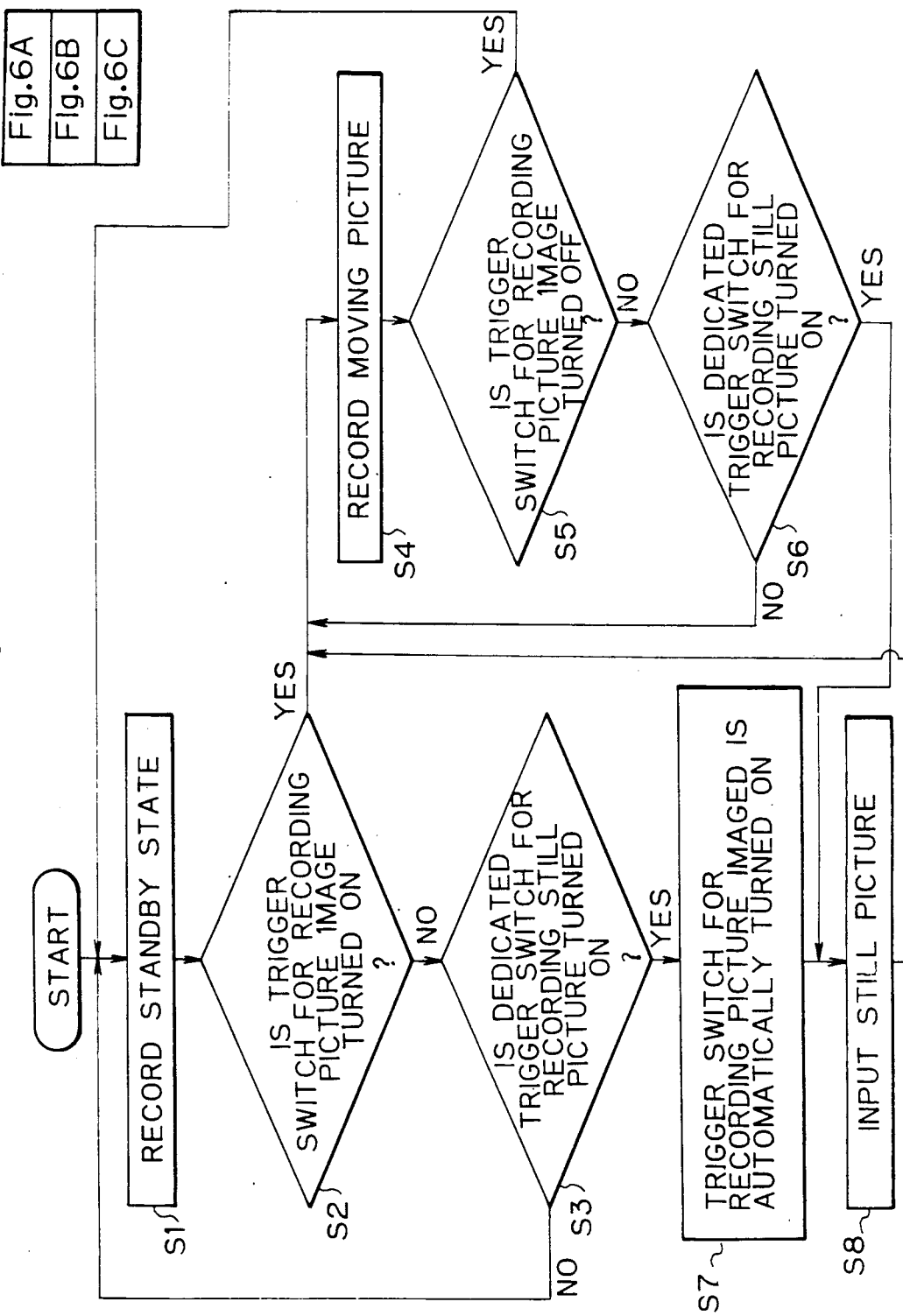

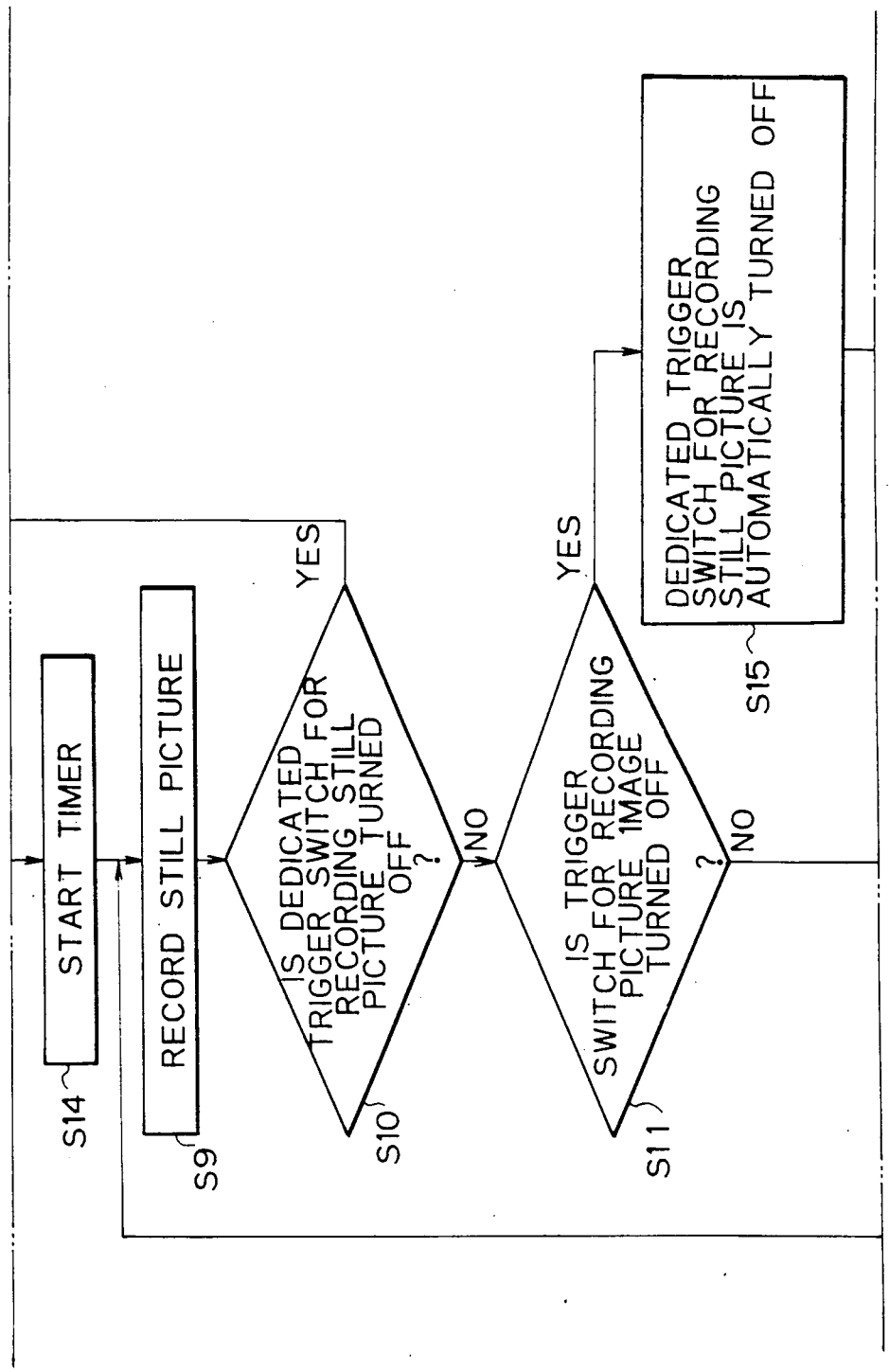

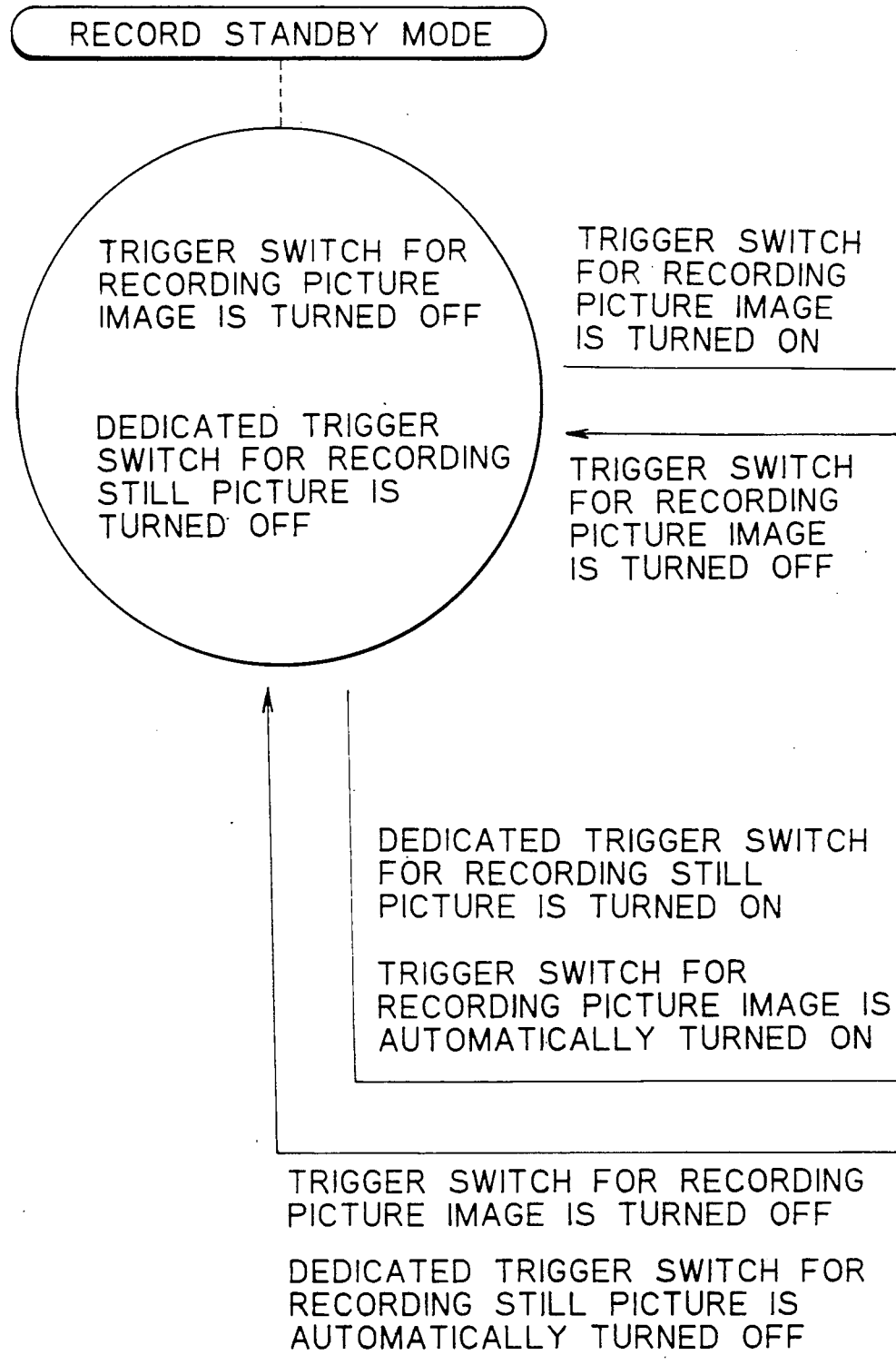

STILL PICTURE RECORDER UTILIZING A SWITCH CONTROLLED TIMER

BACKGROUND OF THE INVENTION

1. Field of the Invention

The present invention relates to a recorder for recording a still picture to a recording medium.

2. Description of the Related Art

An unmoving photographed object or a so-called still picture is recorded by using a recorder for recording a moving picture such as a video tape recorder (which is simply called a VTR in the following description). When such a still picture is recorded, the still picture photographed by an image pickup device and recorded to a recording medium is sufficiently confirmed at a reproducing time and a recording portion of the still picture is retrieved. The photographing operation must be continuously performed in a state in which both the photographed object and the image pickup device are fixed for at least several to several ten seconds so as to sufficiently confirm the still picture at the reproducing time and retrieve the recording portion thereof. However, it is very difficult to perform such a continuous photographing operation and an obtained produced image tends to be blurred by vibration of the image pickup device, etc. Further, it is necessary to use a tripod, etc. so that it becomes complicated to record the still picture and the burden of a photographer is large at the photographing time.

SUMMARY OF THE INVENTION

It is therefore a first object of the present invention to provide a still picture recorder for easily recording a still picture to a recording medium.

A second object of the present invention is to provide a still picture recorder for arbitrarily setting a time for recording a still picture to a recording medium.

The above objects of the present invention can be achieved by a still picture recorder comprising a video signal producing circuit for converting a picked-up image to a video signal; a memory section for storing information as a still picture from video information transmitted from the video signal producing circuit by a supplied control signal, the memory section transmitting the still picture information stored in accordance with the control signal; recording means for recording the video information to a recording medium in accordance with the control signal; a switch for indicating that the still picture is recorded to the recording means; and a control section for transmitting the control signal to the memory section and the recording means by operating the switch.

In accordance with the above structure, when the switch is once operated, the control section transmits the control signal to the memory section and the recording means. The momentary video information of the video signal during the photographing operation is stored to the memory section as the still picture information. The video information of the still picture stored to the memory section is recorded to the recording medium disposed in the recording means.

The control section transmits the control signal for controlling a recording time of the video information of the still picture recorded to the recording means in accordance with the operating time of the switch to the memory section and the recording means.

Further objects and advantages of the present invention will be apparent from the following description of the preferred embodiments of the present invention as illustrated in the accompanying drawings.

BRIEF DESCRIPTION OF THE DRAWINGS

FIGS. 3 and 4 are block diagrams showing the construction of a video taper recorder of the camera integral type in which a still picture recorder in a second embodiment of the present invention is disposed;

FIG. 5 is a block diagram showing the relationship between FIG. 5A and FIG. 5B; FIGS. 5A and 5B are flow charts showing the operation of the video taper recorder of the camera integral type shown in FIG. 3;

FIG. 6 is a block diagram showing the relationship between FIG. 6A, FIG. 6B and FIG. 6C; FIGS. 6A, 6B and 6C are flow charts showing the operation of the video tape recorder of the camera integral type shown in FIG. 4;

FIG. 7 is a block diagram showing the relationship between FIG. 7A and FIG. 7B; FIGS. 7A and 7B are views showing the relation between an operating state of the video tape recorder of the camera integral type and operating states of a dedicated trigger switch for recording a still picture and a trigger switch for recording a picture image in the still picture recorder in the second embodiment of the present invention;

DESCRIPTION OF THE PREFERRED EMBODIMENTS

The preferred embodiments of a still picture recorder in the present invention will next be described in detail with reference to the accompanying drawings.

Figure 1:
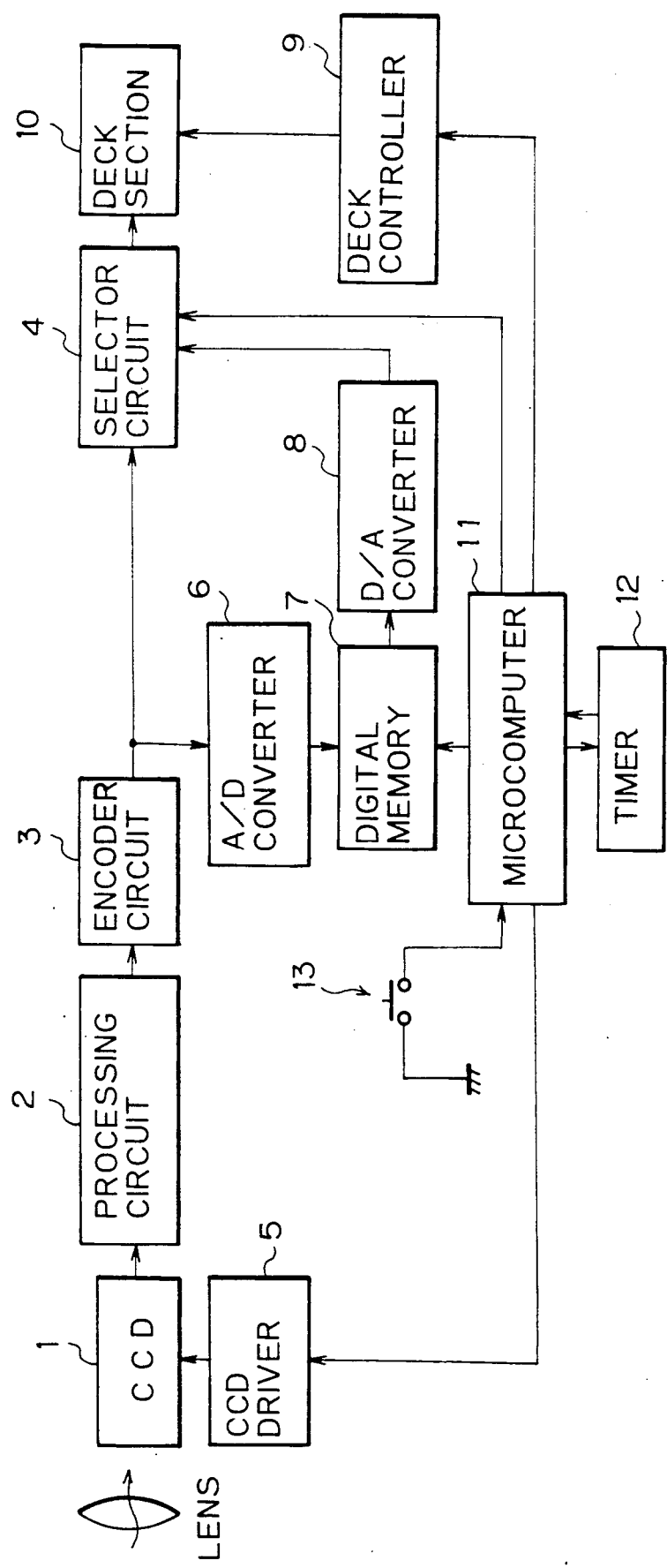
FIG. 1 is a block diagram showing the construction of a video taper recorder of a camera integral type in which a still picture recorder in a first embodiment of the present invention is disposed.

FIG. 1 shows a still picture recorder in a first embodiment of the present invention. FIG. 1 also shows a video tape recorder of a camera integral type in which a video camera and a video tape recorder are integrally formed.

A charge coupled device (which is simply called CCD in the following description) 1 converts a picked-up image provided through a photographing lens disposed in a video camera section to an electric signal. A CCD driver 5 is connected onto an input side of the charge coupled device 1 and controls the timing of an electric signal transmitted from the charge coupled device 1 in accordance with a control signal transmitted from a microcomputer 11. An encoder circuit 3 is connected onto an output side of the charge coupled device 1 through a processing circuit 2 for processing an electric signal transmitted from the charge coupled device 1. The encoder circuit 3 produces and transmits a video signal of e.g., an NTSC system. An output side of the encoder circuit 3 is directly connected to a selector circuit 4. An A/D converter 6 converts the video signal transmitted from the encoder circuit 3 to a digital signal. A digital memory 7 stores video information transmitted from the A/D converter 6. A D/A converter 8 converts the video information read out of the digital memory 7 to an analog signal. The output side of the encoder circuit 3 is also connected to the selector circuit 4 through the A/D converter 6, the digital memory 7 and the D/A converter 8. An output side of the selector circuit 4 is connected to a deck section 10 for recording video information to a recording medium.

The selector circuit 4 selects one of the video information transmitted from the encoder circuit 3 and the video information of a still picture transmitted from the D/A converter 8 in accordance with the control signal supplied from the microcomputer 11. The selector circuit 4 then transmits the selected video information to the deck section 10. When a trigger switch 13 connected onto an input side of the microcomputer 11 is turned on, the microcomputer 11 judges that it is a still picture recording mode for recording the still picture. When the trigger switch 13 is turned off, no still picture is recorded and the microcomputer 11 judges that it is a normal moving picture recording mode for recording a normal picked-up image. Accordingly, the selector circuit 4 transmits the video information transmitted from the D/A converter 8 to the deck section 10 by the control signal transmitted from the microcomputer 11 in the still picture recording mode. The selector circuit 4 transmits the video information transmitted from the encoder circuit 3 to the deck section 10 in the normal moving picture recording mode.

In the still picture recording mode, the digital memory 7 transmits the stored video information to the D/A converter 8 in accordance with the control signal supplied from the microcomputer 11 for a time set by a timer 12 connected to the microcomputer 11.

An input side of the deck section 10 is connected onto an output side of a deck controller 9 for controlling the picture recording operation of the deck section 10. The deck controller 9 is a circuit for transmitting a signal for operating the deck section 10 thereto in accordance with a control signal supplied from the microcomputer 11. In the still picture recording mode, the deck controller 9 operates the deck section 10 for the time set by the timer 12. In the normal picture recording mode, the deck controller 9 operates the deck section 10 at any time.

The operation of the still picture recorder constructed as above will next be described.

In the normal picture recording mode, it is not necessary for an operator to operate the trigger switch 13 and the trigger switch 13 is turned off. Accordingly, a contact of the selector circuit 4 is connected onto the side of the encoder circuit 3 by a control signal transmitted from the microcomputer 11. The deck controller 9 sets the operating state of the deck section 10 to a picture recording state. A picked-up image converted to an electric signal by the charge coupled device 1 is provided as a video signal of the NTSC system by the encoder circuit 3 through the processing circuit 2. This video signal is further supplied to the deck section 10 through the selector circuit 4 and is recorded to a recording medium disposed in the deck section 10. In the normal picture recording mode, the control signal is transmitted from the microcomputer 11 to the digital memory 7 so as to inhibit the video information from being written to the digital memory 7.

Next, in the still picture recording mode, the operator first operates the trigger switch 13 to set the still picture recording mode.

When the still picture recording mode is set, the digital memory 7 stores the video information supplied from the A/D converter 6 through the encoder circuit 3 when the trigger switch 13 is operated. The digital memory 7 stores this video information as a still picture by the control signal supplied from the microcomputer 11. No writing operation of the video information with respect to the digital memory 7 is inhibited after one field amount of the video information has beeb written to the digital memory 7. A counting value of the timer 12 is reset to zero by the control signal transmitted from the microcomputer 11 and the counting operation of the timer 12 is started. Simultaneously, the deck controller 9 is set to the picture recording mode by the control signal supplied from the microcomputer 11 so that the deck controller 9 sets the operating state of the deck section 10 to a picture recordable state. Simultaneously, the contact of the selector circuit 4 is switched onto the side of the D/A converter 8 by the control signal supplied from the microcomputer 11.

Accordingly, the video information as one field amount of still picture stored to the digital memory 7 begins to be read therefrom. The read video information begins to be recorded to the recording medium disposed in the deck section 10 through the D/A converter 8 and the selector circuit 4.

The still picture is recorded to the recording medium for the predetermined time set by the timer 12. The digital memory 7 repeatedly reads the stored video information as one field amount of still picture therefrom for this predetermined time.

When the predetermined time set by the timer 12 has passed, the microcomputer 11 sets the deck controller 9 to either a mode for stopping the picture recording operation or a mode for temporarily stopping the picture recording operation. Thus, the picture recording operation of the deck section 10 is stopped by the control signal supplied from the deck controller 9, or the operating state of the deck section 10 is set to a state in which the picture recording operation is temporarily stopped. At this time, the contact of the selector circuit 4 is switched onto the side of the encoder circuit 3.

As mentioned above, in accordance with the still picture recorder in the present invention, the still picture can be recorded to the recording medium for the predetermined time by instantly operating only the trigger switch 13. Therefore, it is not necessary to fix a video camera to a tripod and it is not necessary for an operator to fixedly support the video camera for a predetermined time as in the general recorder.

In the above-mentioned embodiment of the present invention, the recording time of the still picture is limited to that set by the timer 12, but can be increased or decreased by the same construction as that shown in FIG. 1. Namely, while the still picture is recorded, the microcomputer 11 detects that the trigger switch 13 is again operated, thereby changing the still picture recording time set by the timer 12.

Figure 2:
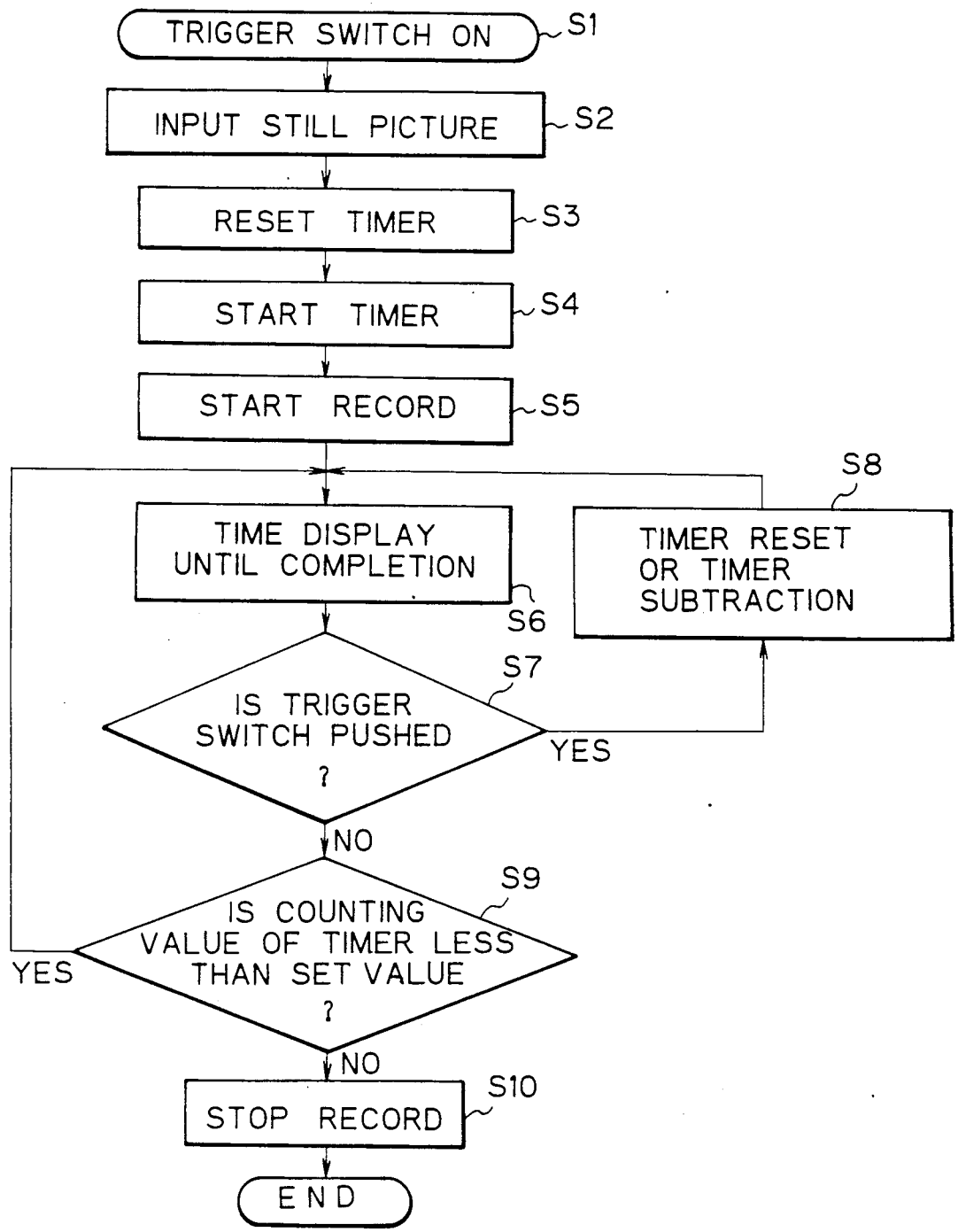
FIG. 2 is a flow chart showing the operation of the video tape recorder having the still picture recorder in the first embodiment of the present invention.

This operation will next be described with reference to FIG. 2. In FIG. 2, reference numerals S1, S2,—respectively designate step 1, step 2,—.

In step S1, the still picture recording mode is set by first operating the trigger switch 13 by an operator.

In step S2, when the still picture recording mode is set, the digital memory 7 stores one field amount of video information supplied from the A/D converter 6 through the encoder circuit 3 when the trigger switch 13 is operated. The digital memory 7 stores this video information as a still picture by the control signal supplied from the microcomputer 11. In step S3, the counting value of the timer 12 is then reset to zero by the control signal transmitted from the microcomputer 11. In step S4, the counting operation of the timer 12 is started. Simultaneously, the deck controller 9 is set to the picture recording mode by the control signal supplied from the microcomputer 11 so that the deck controller 9 sets the operating state of the deck section 10 to a picture recordable state. Simultaneously, the contact of the selector circuit 4 is switched onto the side of the D/A converter 8 by the control signal supplied from the microcomputer 11.

Accordingly, the video information as the still picture stored to the digital memory 7 begins to be read therefrom in step S5. The read video information begins to be recorded to the recording medium disposed in the deck section 10 through the D/A converter 8 and the selector circuit 4.

In step S6, the remaining time of the still picture recording time set by the timer 12 is displayed by a view finder or an LCD panel disposed in the still picture recorder, for example, to display the picked-up image.

In step S7, the microcomputer 11 judges whether the trigger switch 13 is turned on or not.

When the trigger switch 13 is not operated and is therefore turned off, the microcomputer 11 judges in step S9 whether or not the counting value of the timer 12 exceeds the time set by the timer 12. When this counting time does not exceed the time set by the timer 12, the processings from step S6 to step S9 are repeatedly performed. When the counting value exceeds the time set by the timer 12, the microcomputer 11 sets the deck controller 9 to either the mode for stopping the picture recording operation or the mode for temporarily stopping the picture recording operation in step S10. Thus, the picture recording operation of the deck section 10 is stopped by the control signal supplied from the deck controller 9, or the operating state of the deck section 10 is set to a state in which the picture recording operation is temporarily stopped. At this time, the contact of the selector circuit 4 is switched onto the side of the encoder circuit 3.

When the trigger switch 13 is turned on in step S6 during the still picture recording operation, the microcomputer 11 again resets the counting value of the timer 12 to zero, or performs a subtracting operation with respect to the time set by the timer 12 in accordance with a subtracting time set in advance in step S8. Thus, the time set by the timer 12 is increased or decreased. Thereafter, the microcomputer 11 repeatedly performs the processings in steps S7 and S8. When the operator then turns the trigger switch 13 off, the processing in the next step S9 is performed. Next, the microcomputer 11 judges in step S9 whether the counting value of the timer 12 exceeds the set time thereof or not. When the counting value of the timer 12 does not exceed the set time thereof, the processings from step S6 to step S9 are repeatedly performed as mentioned above.

When the counting value of the timer 12 exceeds the set time thereof in step S9, the microcomputer 11 immediately sets the deck section 10 through the deck controller 9 to the mode for stopping the picture recording operation or the mode for temporarily stopping the picture recording operation. Further, the contact of the selector circuit 4 is switched onto the side of the encoder circuit 3.

Further, the contact of the selector circuit 4 is switched onto the side of the encoder circuit 3.

Thus, in accordance with the still picture recorder in the above embodiment, the recording time of the still picture can be arbitrarily changed by the operator. Further, the operation of an added constructional portion for performing the above operation is not complicated since only the trigger switch 13 is operated.

In the above embodiment, the microcomputer 11 and the timer 12 are separately disposed, but the timer 12 may be disposed within the microcomputer 11.

In the above first embodiment, one trigger switch is disposed to input the still picture and control the recording operation of the still picture with respect to the recording medium.

Figure 3:
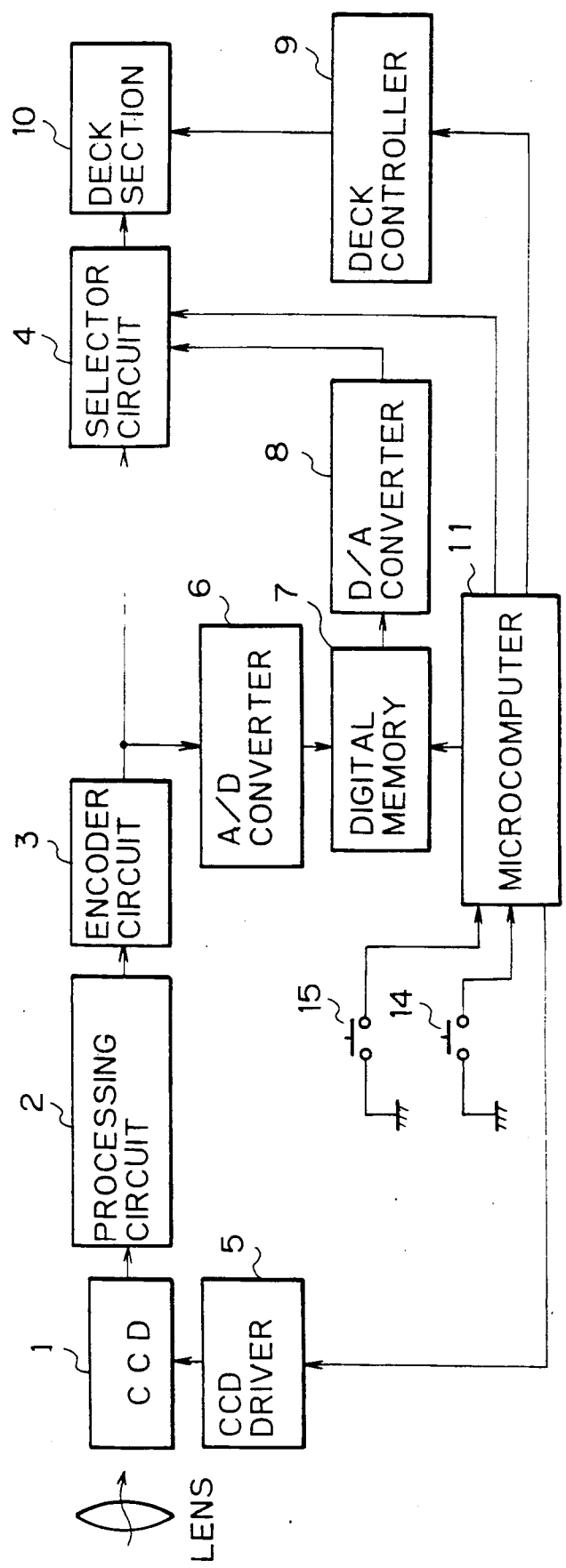

FIGS. 3 and 4 show a still picture recorder in a second embodiment of the present invention. In this second embodiment, the still picture recorder has two trigger switches composed of a dedicated trigger switch 14 for recording a still picture and a trigger switch 15 for recording a picture image. These two trigger switches are disposed to provide three operating states composed of a still picture recording state, a moving picture recording state as the normal recording state and a record standby state in a video tape recorder of the camera integral type having the still picture recorder. In FIGS. 3 and 4, the same constructional portions as those in FIG. 1 are designated by the same reference numerals, and therefore the explanation thereof is omitted. Output sides of the dedicated trigger switch 14 for recording a still picture and the trigger switch 15 for recording a picture image are connected to an input side of the microcomputer 11. In the video tape recorder of the camera integral type shown in FIG. 3, no timer is connected to the microcomputer 11 and the time for recording the still picture is controlled by the operations of the above two trigger switches.

The operation of the video tape recorder of the camera integral type shown in FIG. 3 and having the still picture recorder in the present invention will next be described with reference to FIG. 5. Further, the operation of the video tape recorder of the camera integral type shown in FIG. 4 will next be described with reference to FIG. 6.

In FIG. 5, the video tape recorder of the camera integral type is set to a record standby state in step S1. In step S2, the trigger switch 15 for recording a picture image is turned on. Thus, in step S4, the operating state of the video tape recorder of the camera integral type is set to the normal moving picture recording state for recording a picked-up image. When the trigger switch 15 is turned off in step S5, the operating state of the video tape recorder of the camera integral type is again returned to the record standby state in step S1. When the dedicated trigger switch 14 is turned off in step S6, the moving picture recording state in step S4 is maintained.

When the trigger switch 15 is continued to be turned off in step S2 and the dedicated trigger switch 14 is also continued to be turned off in step S3, the video tape recorder of the camera integral type holds the record standby state in step S1. In contrast to this, when the dedicated trigger switch 14 is turned on in step S3, the trigger switch 15 is automatically turned on in step S7 and the video information of the still picture is inputted to the video tape recorder in step S8. As explained in the above-mentioned first embodiment, "the video information is inputted to the video tape recorder" means that the video information is recorded to the digital memory 7. The still picture is also inputted to the video tape recorder when the dedicated trigger switch 14 is turned on in step S6. In step S9, the still picture is recorded to the recording medium as explained in the first embodiment of the present invention.

When the dedicated trigger switch 14 is then turned off in step S10, the operating state of the video tape recorder of the camera integral type is returned to the moving picture recording state in step S4. In contrast to this, When the dedicated trigger switch 14 is turned on in step S10 and the trigger switch 15 is also turned on in step S11, the video tape recorder of the camera integral type repeatedly performs the processings from step S9 to step 11. When the trigger switch 15 is turned off in step S11, the dedicated trigger switch 14 is automatically turned off in step S12 and the video tape recorder of the camera integral type attains the record standby state in step S13.

Figure 7B:
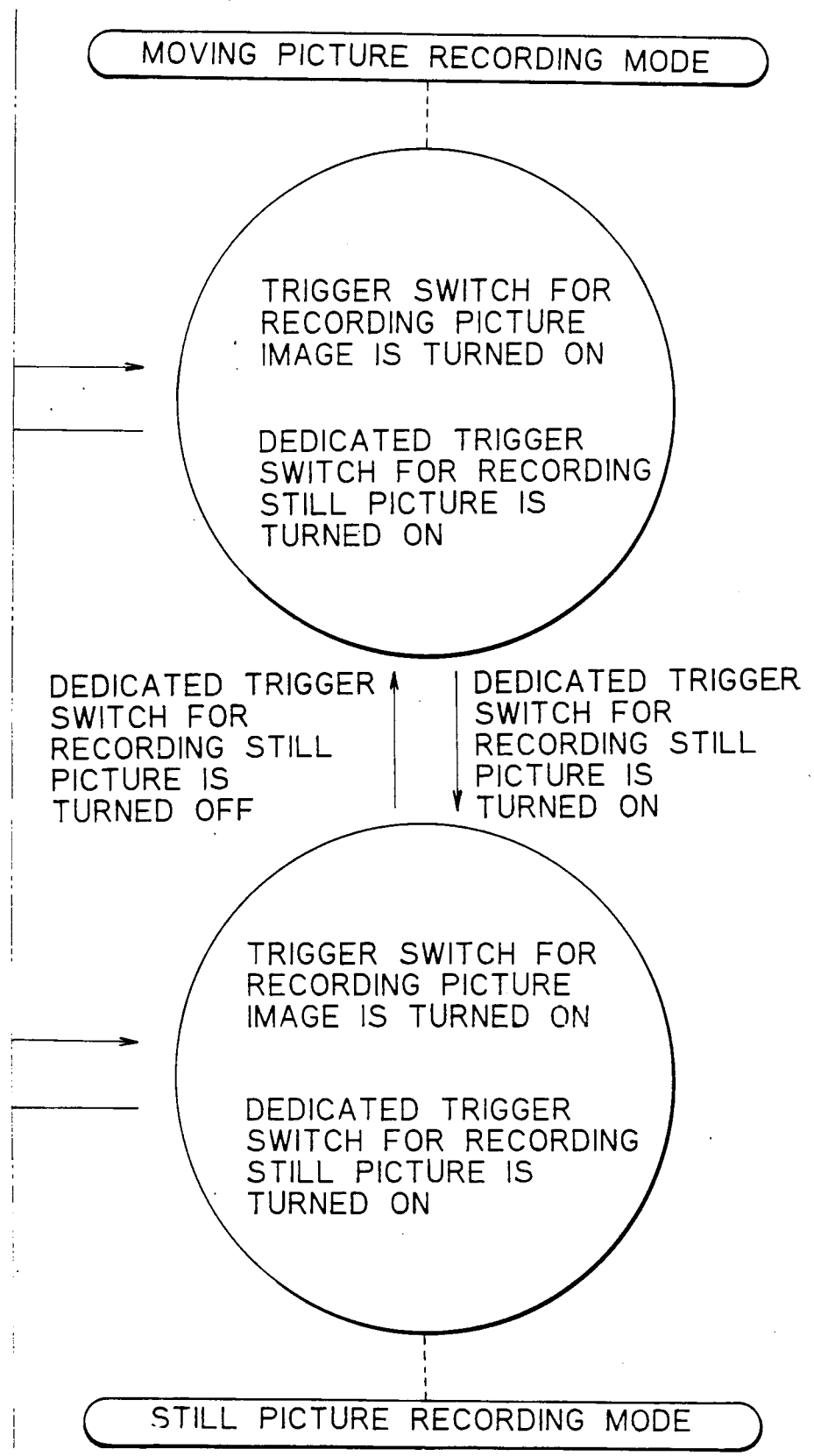

Similar to the first embodiment, in the recording operation of the still picture with respect to the recording medium, the video information at the operating time of the dedicated trigger switch 14 is stored to the digital memory 7 as still picture information. The stored still picture information is transmitted from the digital memory 7. Therefore, it is easy to record the still picture to the recording medium. Further, when the trigger switch 15 is turned on, the time for recording the still picture can be set as a time for which the dedicated trigger switch 14 is turned on. When the trigger switch 15 is turned on, the operating state of the video tape recorder of the camera integral type can be set to the moving picture recording state. As shown in FIG. 7, the operating state of the video tape recorder of the camera integral type can be set to the record standby state, the moving picture recording state and the still picture recording state by a combination of the turning-on and turning-off states of the trigger switches 14 and 15.

Figure 6C:
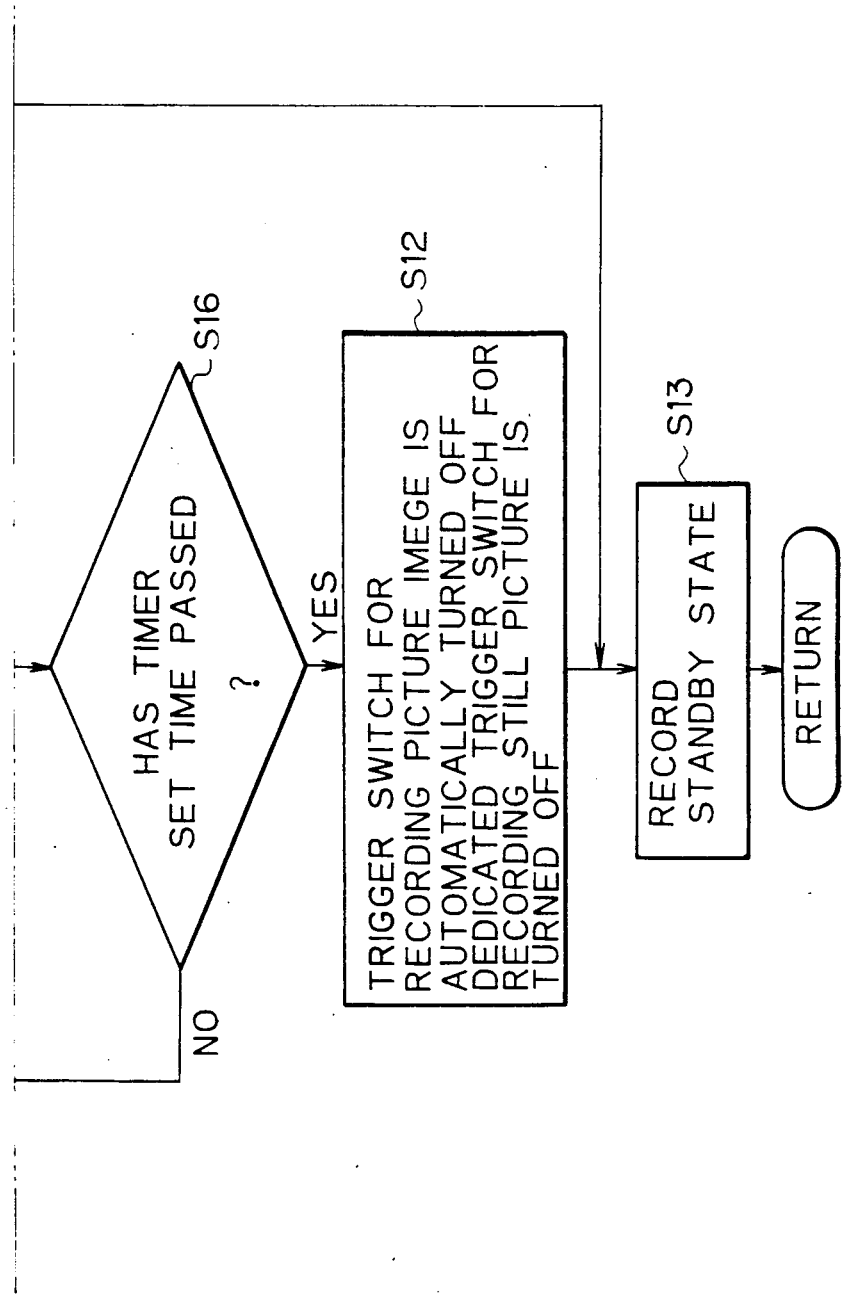

In FIG. 6, the same portions as those in FIG. 5 are designated by the same reference numerals and the explanation thereof is therefore omitted.

The inputting operation of a still picture is started in step S8 and simultaneously the counting operation of the timer 12 is started in step S14. The still picture begins to be recorded in step S9. When the dedicated trigger switch 14 and the trigger switch 15 are continued to be turned on in steps S10 and S11, it is judged in step S16 whether or not the counting value of the timer 12 exceeds the time set by the timer 12. When the counting value of the timer 12 does not exceed the set time thereof, the processings in steps S9 to S11 and step S16 are repeatedly performed. When the counting value of the timer 12 exceeds the set time thereof, the dedicated trigger switch 14 and the trigger switch 15 are automatically turned off in step S12. The operating state of the video tape recorder of the camera integral type is set to the record standby state in step S13. When the trigger switch 15 is turned off in step S11, the dedicated trigger switch 14 is automatically turned off in step S15 and the operating state of the video tape recorder of the camera integral type is set to the record standby state in step S13.

Since the timer 12 is disposed, in addition to the operation of the video tape recorder of the camera integral type, the recording time of the still picture can be changed within the time set by the timer 12 in accordance with the operating states of the trigger switches 14 and 15.

Figure 8:
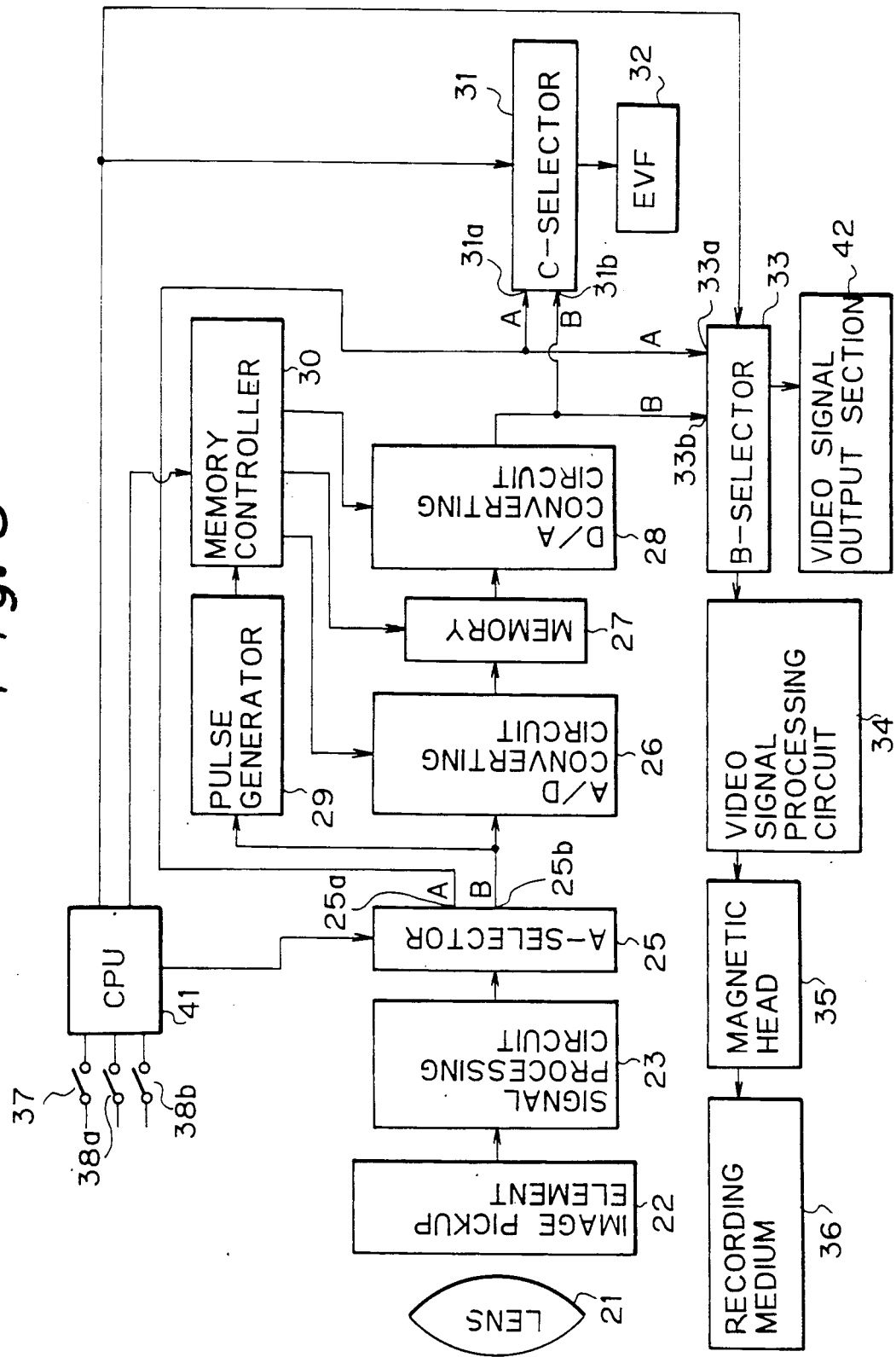
FIG. 8 is a block diagram showing the construction of a video tape recorder of the camera integral type having a still picture recorder in a third embodiment of the present invention.

FIG. 8 shows a video tape recorder of the camera integral type having a still picture recorder in a third embodiment of the present invention. In this embodiment, an image pickup element 22 converts an image formed through a photographing lens 21 disposed in a video camera section into an electric signal. An output side of the image pickup element 22 is connected to an A-selector 25 through a signal processing circuit 23 for converting the above electric signal to a composite signal of e.g., the NTSC system.

The A-selector 25 is a circuit for switching and transmitting the composite signal supplied from the signal processing circuit 23 to an A-side output terminal 25a or both the A-side output terminal 25a and a B-side output terminal 25b. This switching operation is performed by a control signal transmitted from a central processing unit 41 in accordance with the operating states of an operating button 37 for stopping a picture recording operation and an operating button 38 for starting the recording operation of a still picture shown in FIG. 9. The A-side output terminal 25a is connected to an A-side input terminal 33a of a B-selector 33 and an A-side input terminal 31a of a C-selector 31. The B-side output terminal 25b is connected to an A/D converting circuit 26 for converting the above composite signal to a digital signal and a pulse generator 29 for generating a predetermined synchronization signal from the above composite signal.

The A/D converting circuit 26 is connected to a memory 27 and an output side of the memory 27 is connected to a B-side input terminal 33b of the B-selector 33 and a B-side input terminal 31b of the C-selector 31 through a D/A converting circuit 28 for converting the digital signal to an analog signal. The A/D converting circuit 26, the memory 27 and the D/A converting circuit 28 are connected to an output side of a memory controller 30 for controlling writing and reading operations of video information with respect to the memory 27 by the synchronization signal transmitted from the pulse generator 29.

Similar to the above A-selector 25, the B-selector 33 and the C-selector 31 are circuits for selecting the A-side or B-side input terminal thereof by the control signal transmitted from the central processing unit 41 in accordance with the operating states of the operating button 37 for stopping the picture recording operation and the operating button 38 for starting the recording operation of the still picture.

Figure 9:
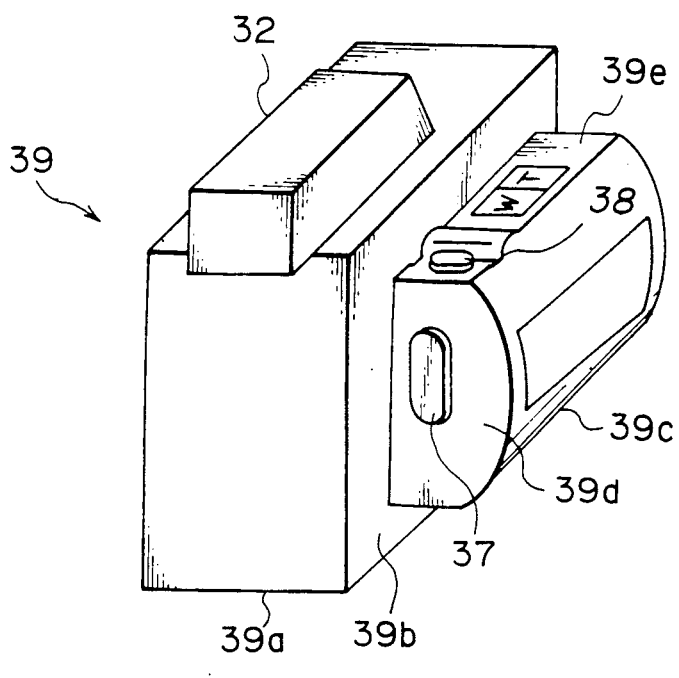
FIG. 9 is a perspective view showing the entire shape of the video tape recorder of the camera integral type having the still picture recorder in the third embodiment of the present invention.

An output side of the C-selector 31 is disposed in the video tape recorder of the camera integral type and is connected to an electronic view finder (EVF) 32 as shown in FIG. 9 in which a picked-up image during the photographing operation is normally displayed on the screen.

An output side of the B-selector 33 is switched to a video signal processing circuit 34 or a video signal output section 42 in accordance with the control signal transmitted from the central processing unit 41. The video signal processing circuit 34 performs a predetermined signal processing to record the video information as the above composite signal onto a video tape. The video signal output section 42 transmits a video signal to another system except for a system for recording a picture image and disposed in a video tape recorder 39 of the camera integral type.

An output side of the video signal processing circuit 34 is connected to a magnetic head 35 and the above video information is recorded onto the video tape as a recording medium 36 by the operation of the magnetic head 35.

In such a video tape recorder 39 of the camera integral type, the electronic view finder 32 is disposed in an upper portion of a box-shaped body 39a. An operating portion 39c is disposed on a side 39b of the body 39a and has an operating button of this video tape recorder, etc. The above-mentioned operating button 37 is disposed on an operator's side 39d of the operating portion 39c to operate a corresponding circuit for starting the recording operation of the picture image when this button 37 is pushed. The above-mentioned operating button 38 is constructed by a two-stage switching structure and is disposed on an upper side 39e of the operating portion 39c to start the recording operation of the still picture when this switch 38 is pushed.

Figure 10:
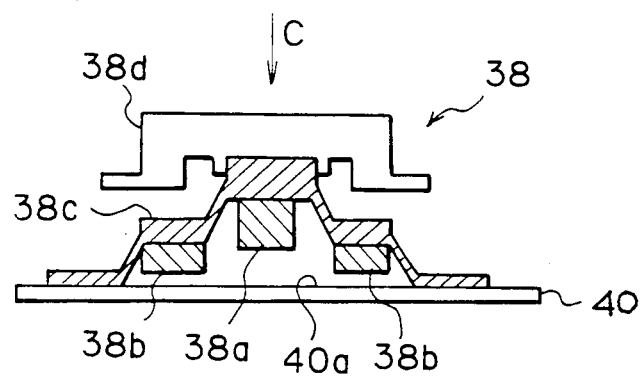
FIG. 10 is a cross-sectional view showing the construction of an operating button for starting the recording operation of a still picture.

The two-stage switching structure of the operating button 38 is generally provided as shown in FIG. 10. In this structure, a first stage contact portion 38b is opposite to a face 40a of a printed board 40 having a printed circuit thereon and is spaced from this face 40a by a small distance. A second stage contact portion 38a is opposite to the printed board face 40a and is spaced from this face 40a by a large distance. The first stage contact portion 38b and the second stage contact portion 38a are attached to a rubber contact switch 38c and this rubber contact switch 38c is disposed on the printed board face 40a. An operating button 38d is attached onto the rubber contact switch 38c to press the rubber contact switch 38c toward the printed board face 40a.

In the operating button 38 having the above structure, the first stage contact 38b comes in contact with the printed circuit on the printed board face 40a by slightly pressing the operating button 38d toward the printed board face 40a as shown by an arrow C. Further, the second stage contact portion 38a also comes in contact with the above printed circuit by further pressing the operating button 38d in the direction shown by the arrow C.

The operation of the above video tape recorder of the camera integral type having the still picture recorder in the third embodiment of the present invention will next be described.

Video information is converted to an electric signal by the image pickup element 22 and is further converted to a predetermined composite signal by the signal processing circuit 23 and is then supplied to the A-selector 25.

In the case in which both the operating buttons 37 and 38 are not operated, i.e., in the case of the record standby state, the contact of the A-selector 25 is switched onto the side of the A-side output terminal 25a and the contact of the B-selector 33 is switched onto the side of the A-side input terminal 33a by the control signal of the central processing unit 41. At this time, the C-selector 31 selects the A-side input terminal 31a in accordance with the control signal transmitted from the central processing unit 41 and transmits a video signal to the electronic view finder 32. The output side of the B-selector 33 is connected to the video signal output section 42 in accordance with the control signal transmitted from the central processing unit 41 and is not connected to the video signal processing circuit 34. Accordingly, the video signal transmitted from the A-selector 25 is transmitted to the video signal output section 42 through the B-selector In the case in which the operating button 37 is operated and the operating button 38 is not operated, i.e., in the case of the picture recording state, the contact of the A-selector 25 is switched onto the A-side output terminal 25a, the contact of the B-selector 33 is switched onto the A-side input terminal 33a, and the contact of the C-selector 31 is switched onto the A-side input terminal 31a in accordance with the control signal transmitted from the central processing unit 41. The output side of the B-selector 33 is connected to the side of the video signal processing circuit 34 in accordance with the control signal transmitted from the central processing unit 41.

Accordingly, in this case, the video information transmitted from the A-selector 25 during the photographing operation is recorded to the recording medium 36 through the B-selector 33, the video signal processing circuit 34 and the magnetic head 35. Further, this video information is visually displayed on the screen of the electronic view finder 32 through the C-selector 31.

In the case of a half-pushing state in which the operating button 37 is not operated and the first stage contact portion 38b of the operating button 38 comes in contact with the printed circuit of the printed board face 40a, the contact of the A-selector 25 is connected to both the A-side output terminal 25a and the B-side output terminal 25b. Further, the contact of the B-selector 33 is connected to the A-side input terminal 33a and the output side of the B-selector 33 is connected to the video signal processing circuit 34. The contact of the C-selector 31 is connected to the B-side input terminal 31b.

The video information transmitted from the A-selector 25 is converted into a digital signal by the A/D converting circuit 26 and is stored to the memory 27. Further, a synchronization signal is produced by the pulse generator 29 and is transmitted to the memory controller 30. In the case of the half-pushing state of the operating button 38, the central processing unit 41 transmits the control signal to the memory controller 30 such that the memory 27 continuously holds the video information transmitted from the A-selector 25 in this button half-pushing state and the memory controller 30 controls the operations of the A/D converting circuit 26, the memory 27 and the D/A converting circuit 28. The video information as the still picture stored to the memory 27 is converted into an analog signal by the D/A converting circuit 28 and is visually displayed on the screen of the electronic view finder 32 through the C-selector 31. Accordingly, the video information displayed on the screen of the electronic view finder 32 is that of the still picture provided when an operator sets the operating state of the operating button 38 to the half-pushing state thereof.

When the video information stored to the memory 27 is changed, the half-pushing state of the operating button 38 is once released and the operating state of the operating button 38 is again set to the half-pushing state so that new video information can be stored to the memory 27.

As mentioned above, the operator can confirm the stored video information as the still picture by the electronic view finder 32. For example, when the still picture image is blurred, the video information of a new still picture can be stored to the memory 27 by again performing the storing operation.

When the video information stored to the memory 27 is recorded to the recording medium 36 in a state in which the operating button 38 is in the half-pushing state and the video information is stored to the memory 27, the operating button 37 is not operated and the operating button 38 is further pushed-in from the half-pushing state. Thus, the second stage contact portion 38a comes in contact with the printed circuit of the printed board face 40a, thereby providing a complete pushing state. Thus, the contact of the B-selector 33 is connected to the B-side input terminal 33b. Therefore, the video information of the still picture transmitted from the D/A converting circuit 28 is recorded to the recording medium 36 through the B-selector 33, the video signal processing circuit 34 and the magnetic head 35. At this time, the video information of the still picture is recorded to the recording medium 36 while the operating state of the operating button 38 is set to the complete pushing state by the operator. Thus, the operator can set a desirable recording time of the still picture. After the completion of the recording operation, the operating state of the video tape recorder of the camera integral type is changed to the record standby state. Since the contact of the C-selector 31 is connected to the B-side input terminal 31b, the video information as the still picture transmitted from the D/A converting circuit 28 is visually displayed on the screen of the electronic view finder 32.

Next, when the operating button 37 is operated to insert and store the still picture into the recording medium 36 during the picture recording operation, the operating button 38 is operated and set to the half pushing state so that the contact of the A-selector 25 is connected to the A-side output terminal 25a and the B-side output terminal 25b. Thus, similar to the above-mentioned operations, the video information of the still picture is stored to the memory 27 and the contact of the C-selector 31 is connected to the B-side input terminal 31b. Therefore, the video information of the still picture stored to the memory 27 is visually displayed on the screen of the electronic view finder 32. At this time, the contact of the B-selector 33 is connected to the A-side input terminal 33a and the output side of the B-selector 33 is connected to the side of the video signal processing circuit 34 by the control signal of the central processing unit 41. Thus, the video information transmitted from the A-side output terminal 25a of the A-selector 25 is recorded to the recording medium 36 through the B-selector 33, the video signal processing circuit 34 and the magnetic head 35.

When the operating state of the operating button 38 is next set to the complete pushing state, the contact of the B-selector 33 is switched to the B-side input terminal 33b. Thus, the video information of the still picture transmitted from the D/A converting circuit 28 is recorded to the recording medium 36 through the B-selector 33, the video signal processing circuit 34 and the magnetic head 35. At this time, similar to the above-mentioned case, the still picture is recorded to the recording medium while the operating state of the operating button 38 is set to the complete pushing state by the operator. After the completion of the recording operation of the still picture, the operating state of the video tape recorder of the camera integral type is changed to the record standby state. The video tape recorder of the camera integral type has a known voice recorder so that voice can also be recorded to the recording medium 36 during the recording operation of the still picture. The operations of the A-selector 25, the B-selector 33 and the C-selector 31 are controlled by the central processing unit 41, but may be controlled by an operating switch.

As mentioned above, similar to the first and second embodiments, in the video tape recorder of the camera integral type in the above third embodiment, the still picture can be easily recorded to the recording medium by operating the operating button 38 for starting the recording operation of the still picture. Further, the time for recording the still picture to the recording medium can be set to a time for which the operating button 38 is operated and set to the complete pushing state. The still picture to be recorded to the recording medium 36 can be confirmed by the electronic view finder 32 before the recording operation thereof so that no defective still picture is recorded in many cases.

As mentioned above, in accordance with the still picture recorder of the present invention, momentary video information is stored to the memory as still picture information by operating the operating switch. This still picture information is repeatedly read and recorded to the recording medium so that it is possible to easily record the still picture. Further, the time period for recording the still picture information to the recording medium can be adjusted by increasing or decreasing the operating time of the switch.

Many widely different embodiments of the present invention may be constructed without departing from the spirit and scope of the present invention. It should be understood that the present invention is not limited to the specific embodiments described in the specification, except as defined in the appended claims.

What is claimed is:

1. A video recording apparatus comprising:
    a video signal producing circuit for converting a picked-up image into a video signal;
    a memory section for storing one still video information corresponding to one still video on the basis of the video signal produced from said video signal producing circuit and for transmitting repeatedly the one still video information stored therein for a predetermined interval of time, the storing and the transmission of the one still video information being respectively performed in accordance with a control signal supplied to the memory section;
    a recording means for recording the one still video information transmitted repeatedly from said memory section to a recording medium in accordance with a control signal supplied to the recording means for the predetermined interval of time;
    a switch for indicating the recording of the one still video information to said recording means;
    a timer for setting the predetermined interval of time; and
    a control section for transmitting the control signal to said memory section and said recording means by operation of said switch.

2. A video recording apparatus according to claim 1, in which said control section transmits the control signal to said memory section and said recording means by operation of said switch once.

3. a video recording apparatus according to claim 1, in which field amounts corresponding to the one still video information are stored in said memory section.

4. A video recording apparatus according to claim 1, in which said video recording apparatus further comprises a view finder to confirm the picked-up image before the recording operation of said recording means.

* * * * *